W. W. GOODWIN & S. W. HURLBURT.
Corn-Planter.
No. 207,028. Patented Aug. 13, 1878.
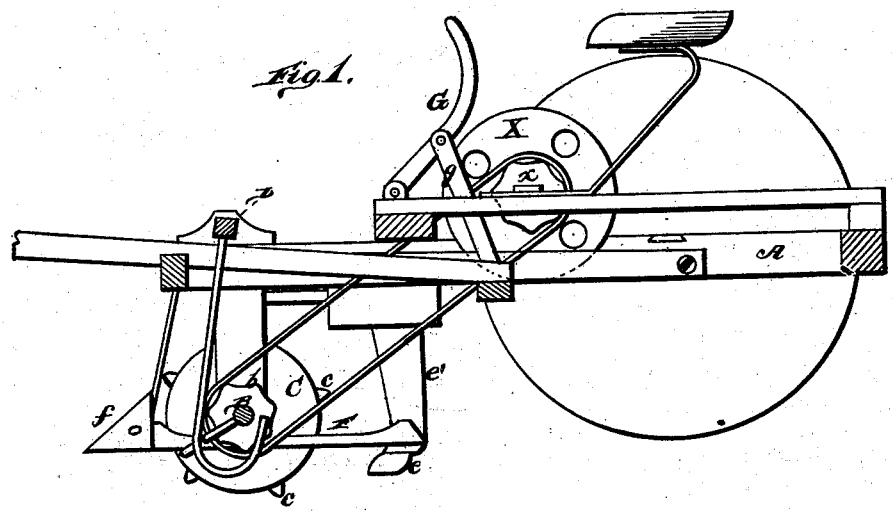
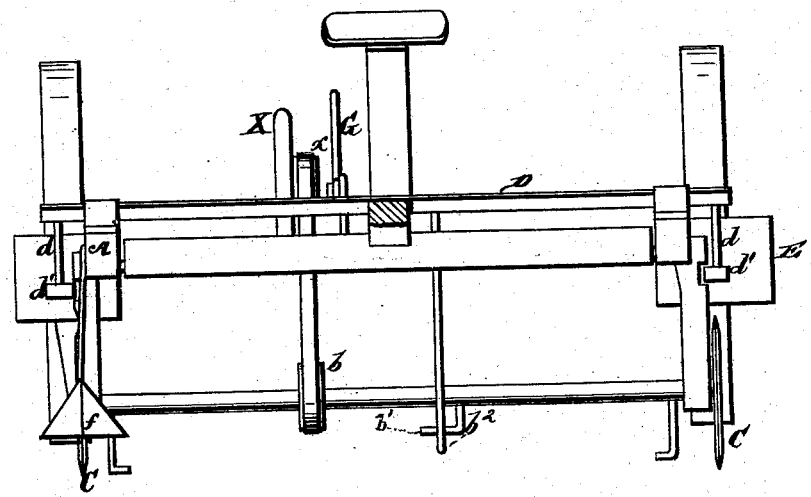

UNITED STATES PATENT OFFICE.

WILLIAM W. GOODWIN AND SAMUEL W. HURLBURT, OF CRESTON, IOWA.

IMPROVEMENT IN CORN-PLANTERS.

Specification forming part of Letters Patent No. 207,028, dated August 13, 1878; application filed July 6, 1878.

*To all whom it may concern:*

Be it known that we, WILLIAM W. GOODWIN and SAMUEL W. HURLBURT, of Creston, in the county of Union and State of Iowa, have invented a new and valuable Improvement in Corn-Planters; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical central section of our corn-planter, and Fig. 2 is a part-sectional front view of the same.

Our invention relates to devices for planting corn and the like, and at the same time marking the places where the hills are planted.

We provide two toothed cutters, hung rigidly upon a suitably-journaled shaft, to which an arm is radially secured, which arm operates the feed mechanism. A shoe is provided with a plow-front adapted to pass above the surface of the ground ahead of the planting device and clear away obstructions and level the ground, so that the corn will not bound out of place. Markers, rigid with the cutter-shaft, designate, by impressions in the soil, where the corn is dropped. A pulley on the shaft is belted to a revolving hand-wheel near the driver's seat, so as to be readily within his reach.

The feed mechanism consists of a slide, which, passing from the hoppers, is operated, through a lever, by a rock-shaft. From this rock-shaft a downwardly-projecting curved arm is operated upon by the elbow-arm from the cutter-shaft. Extending downward from the hoppers are the usual feed-pipes with flaring sides, provided at the bottom with cutter-feet, which follow the cutter-wheels and enter the soil. A lever near the driver's seat allows the driver to keep the shoe with plow-front running along the surface of the ground, which adjustment allows the cutters and feed-shoes to enter the soil the required distance.

The corn is dropped in very narrow drills, and is partially covered by the indropping soil; but the wheels may be furnished with a V-shaped periphery, which will efficiently serve to complete the necessary covering.

Referring to the drawings, A represents the frame, having usual axle and running-gear. B represents a shaft journaled in the fore end of the frame A, at each end of which is rigidly secured cutter-wheels C, having points $c$. A chain-pulley, $b$, on the shaft B connects with a pinion, $x$, on a hand-wheel, X, near the driver's seat. An elbow-arm, $b^1$, on the shaft B operates on two sides of a device, $b^2$, which is rigid with a rock-shaft, D, from which a lever, $d$, operates the feed-slide $d'$ in the hoppers E. $e'$ represents the feed-pipe, and $e$ the flaring shoe thereof. F represents a horizontal shoe, provided at its forward extremity with plow-foot $f$, which serves to clear away obstructions and level the ground, so as to prevent the seed from bounding out of place where they drop.

A lever, G, connected by a link, $g$, to the pole-frame, allows the driver to keep the shoe F running on the surface of the ground, and the cutter-wheels C will consequently operate in the soil, as is obvious.

What we claim as new, and desire to secure by Letters Patent, is—

The cutter-wheels C $c$, combined with the shaft B, pulley $b$, hand-wheel X, elbow-arm $b^1$, rock-shaft D $b^2$, and feed-bar $d'$, as herein specified.

In testimony that we claim the above we have hereunto subscribed our names in the presence of two witnesses.

WILLIAM W. GOODWIN.
SAMUEL WESLEY HURLBURT.

Witnesses:
T. H. McCANDLESS,
A. D. McCANDLESS.